(12) United States Patent
Uchida et al.

(10) Patent No.: US 6,896,271 B2
(45) Date of Patent: May 24, 2005

(54) METAL GASKET WITH COATING AT FLANGE

(75) Inventors: Tatsuro Uchida, Tokyo (JP); Tadashi Kasuya, Tokyo (JP)

(73) Assignee: Ishikawa Gasket Co., Ltd., Tokyo (JP)

(*) Notice: Subject to any disclaimer, the term of this patent is extended or adjusted under 35 U.S.C. 154(b) by 87 days.

(21) Appl. No.: 10/338,368

(22) Filed: Jan. 9, 2003

(65) Prior Publication Data

US 2003/0127804 A1 Jul. 10, 2003

(30) Foreign Application Priority Data

Jan. 9, 2002 (JP) ........................................ 2002-002490

(51) Int. Cl.⁷ ................................................ F02F 11/00
(52) U.S. Cl. ..................... 277/593; 277/591; 277/592; 277/595; 277/596
(58) Field of Search ................... 277/591, 592, 277/593, 594, 595, 596

(56) References Cited

U.S. PATENT DOCUMENTS 5,582,415 A    12/1996  Yoshida et al.
5,931,475 A *   8/1999  Yamada ...................... 277/591
5,938,208 A *   8/1999  Yoshida et al. ............. 277/592
6,299,175 B1 * 10/2001  Maekawa et al. ........... 277/593

FOREIGN PATENT DOCUMENTS

EP    0 486 255    5/1992
EP    1 101 983    5/2001
EP    1 128 098    8/2001

* cited by examiner

Primary Examiner—Robert J. Sandy
Assistant Examiner—Enoch Peavey
(74) Attorney, Agent, or Firm—Manabu Kanesaka

(57) ABSTRACT

A metal gasket for an internal combustion engine is formed of a metal plate including a base portion extending substantially throughout an entire area to be sealed, at least one hole formed in the base portion, a curved portion extending from the base portion, and a flange extending from the curved portion and disposed on a part of an upper surface of the base portion. A coating member is deposited on the flange facing the base portion and/or the base portion facing the flange. The coating member is formed of a non-thermoplastic coating material to operate as a surface pressure regulating member between the flange and the base portion to thereby regulate a surface pressure at the flange.

6 Claims, 3 Drawing Sheets

METAL GASKET WITH COATING AT FLANGE

BACKGROUND OF THE INVENTION AND RELATED ART STATEMENT

The present invention relates to a metal gasket with a coating at a flange, for an internal combustion engine. In particular, a coating is applied to a flange formed at an outer peripheral portion of a plate for the gasket or around a hole to be sealed, to increase a thickness at the flange, so that a sealing pressure is adjusted precisely at the flange.

Conventionally, in a gasket having a portion to be sealed, such as a hole or an outer peripheral portion of the gasket, a flange or turning portion is formed in the gasket around the portion to be sealed. In case a specific surface pressure is required at the flange, a shim as means for forming a surface pressure is sometimes deposited under the flange to increase the thickness thereat. However, in case the shim is used, if the thickness of the shim to be installed is relatively thick, the shim can be easily made and installed. However, if the thickness of the shim is relatively thin, the manufacturing cost of the shim becomes expensive. Also, the adjustment of the thickness by the shim can not be made so easily, so that the entire cost of the gasket becomes high.

The present invention has been made in view of the problems as stated above, and an object of the invention is to provide a metal gasket having a flange or turning portion around a hole to be sealed and/or an outer peripheral portion of the gasket, in which a thickness adjustment at the flange can be easily made at a low cost.

Another object of the invention is to provide a metal gasket as stated above, in which the thickness adjustment at the flange can be surely made as desired.

Further objects and advantages of the invention will be apparent from the following description of the invention.

SUMMARY OF THE INVENTION

A metal gasket of the invention is used for an internal combustion engine, and is basically formed of a metal plate and a coating member. The metal plate includes a base portion extending substantially throughout an entire area to be sealed and having an upper surface, at least one hole formed in the base portion, a curved portion extending from the base portion, and a flange extending from the curved portion and disposed on a part of the upper surface of the base portion.

The coating member is deposited on at least one of the flange facing the base portion and the base portion facing the flange. The coating member is formed of a non-thermoplastic coating material known already in the art to operate as a surface pressure regulating member between the flange and the base portion to thereby regulate a surface pressure at the flange. The coating member does not substantially have compressibility in the heated or operating condition.

The curved portion and the flange are formed around the at least one hole and/or an outer periphery of the base portion to regulate the surface pressure thereat.

In the invention, since the coating member is deposited on at least one of the flange facing the base portion and the base portion facing the flange around the hole, and/or the outer periphery of the base portion to thereby form the surface pressure regulation portion at the flange, the surface pressure can be easily and simply adjusted at a low cost. Especially, a precise adjustment at a thin portion can be made by changing the amount of coating or number of coatings or by adjusting a portion to be coated or changing the thickness proportionally.

The coating member may have a first coating portion formed on the base portion, and a second coating portion formed on the flange. The first and second coating portions are at least partly overlapped when the flange is formed on the base portion.

At least one of the flange and the base portion facing the flange may have a bead extending toward the other. In this case, the coating member is deposited on and around the bead. In case the flange and the base portion have the beads, the beads are arranged to face diagonally with each other, and the first and second coating portions are formed on and around the respective beads.

When a metal gasket is formed, a metal plate is prepared to have a base portion extending substantially throughout an entire area to be sealed, at least one hole formed in the base portion, and a flange forming portion situated around the at least one hole and/or an outer periphery of the base portion. A coating member is deposited on at least one of the flange forming portion and the base portion facing a flange, wherein the coating member is formed of a non-thermoplastic coating material. Then, the flange forming portion is bent to be located on a part of the base portion to have the coating member therebetween. The coating member operates as a surface pressure regulating member between the flange and the base portion to thereby regulate the surface pressure at the flange.

DETAILED DESCRIPTION OF PREFERRED EMBODIMENTS

The embodiments of the invention will be described with reference to the accompanied drawings.

Figure 1:
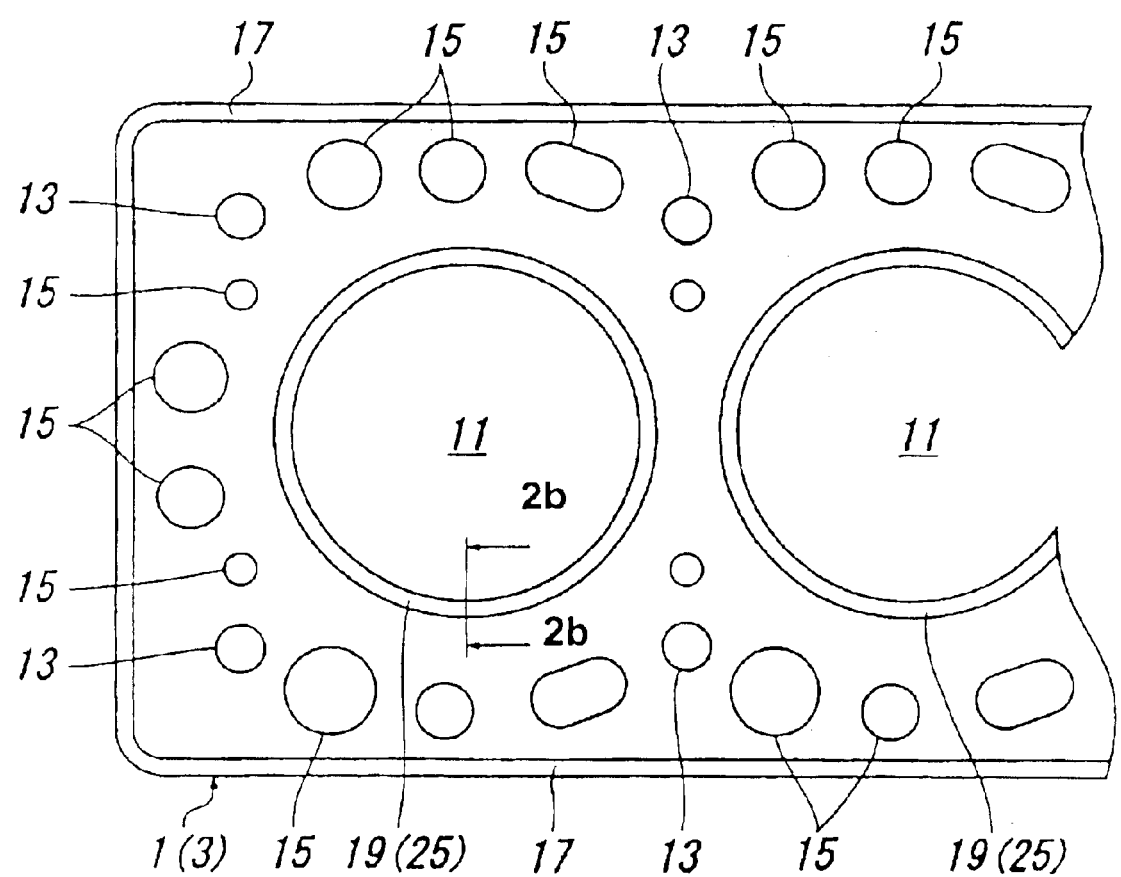
FIG. 1 is a plan view of the first embodiment of a metal gasket of the invention.

A gasket 1 in FIG. 1 is a cylinder head gasket to be installed between a cylinder head and a cylinder block (both not shown), and is formed of a single metal plate 3. The gasket 1 includes cylinder bores 11 corresponding to combustion chambers of the cylinder block, bolt holes 13 arranged around the cylinder bores 11 for receiving bolts for tightening the gasket, and liquid holes 15, such as water holes and oil holes, arranged also around the cylinder bores 11. Also, a turning portion 17 is formed around the outer periphery of the plate 3, and turning portions 19 are formed around the cylinder bores 11 for providing the surface pressures thereat.

Figure 2A:
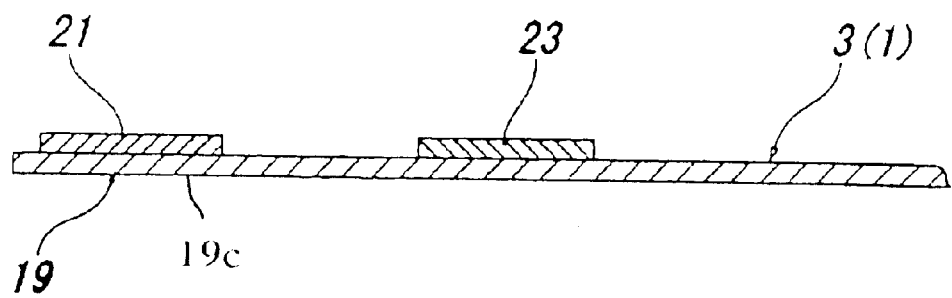
FIG. 2(a) is a partial sectional view of the gasket before forming the first embodiment.
Figure 2B:
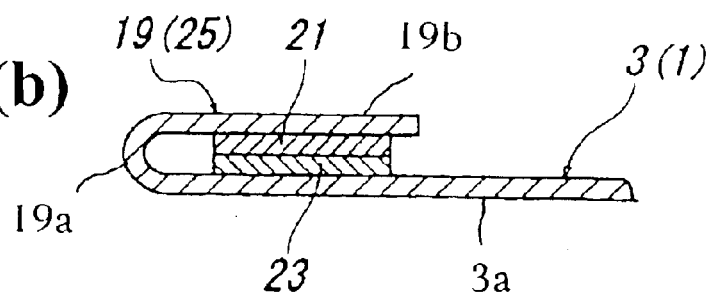
FIG. 2(b) is a partial section view taken along line 2(b)—2(b) in FIG. 1.

As shown in FIG. 2(b), the turning portion 19 includes a curved portion 19a for defining the cylinder bore 11, and a flange 19b extending from the curved portion 19a. The flange 19b is located above a base portion 3a of the metal plate 3.

Also, coating members 21, 23 are sandwiched between the base portion 3a and the flange 19b. The coating members 21, 23 are formed of a non-thermoplastic material already known in the art, which does not substantially have compressibility in a heated or operating condition of the engine. The coating members 21, 23 are applied onto the flange 19b and base portion 3a by screen printing to have appropriate thicknesses by changing the number of coatings, so that a surface pressure adjusting portion 25 is formed to provide an appropriate surface pressure thereat.

In forming the gasket, at first, the metal plate 1 in a flat form is prepared to have holes for the cylinder bores 11, bolt holes 13 and the liquid holes 15. Then, as shown in FIG. 2(a), on a flange forming portion 19c, i.e. same as the flange 19b, and a part of the base portion 3a, the coating members 21, 23 are deposited by the screen printing. Thereafter, the flange forming portion 19c is bent upwardly and turned to be disposed on the base portion 3a, by which the curved portion 19a is formed. In this condition, the coating members 21, 23 abut against each other to form the surface pressure adjusting portion 25.

The turning portion 17 around the outer periphery of the gasket has the same structure as in the turning portion 19. Also, the coating members 21, 23 are deposited between the turning portion 17 and the base portion 3a of the metal plate 3.

The coating members 21, 23 may be applied by an appropriate method other than the screen printing. Also, the thicknesses of the coating members 21, 23 may not be the same thicknesses and may have different thicknesses. The coating members 21, 23 may be changed to provide the desired surface pressure thereat at the surface pressure adjusting portion 25.

Figure 2C:
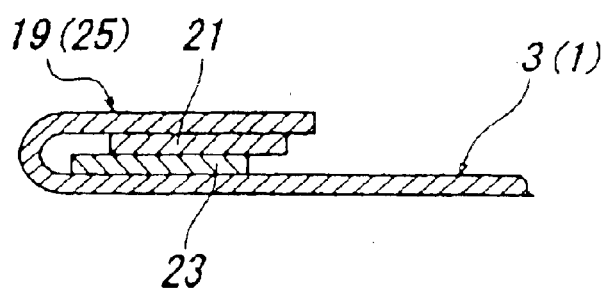
FIG. 2(c) is a sectional view similar to FIG. 2(b) in a modified embodiment.

In the first embodiment as stated above, the coating members 21, 23 are formed partly inside the flange 19c and on the base portion 3a facing the flange 19c to entirely abut against each other. However, the coating members 21, 23 may partly abut against each other, as shown in FIG. 2(c). Also, the coating members 21, 23 may be formed on entire surfaces of the flange and the base portion facing the flange.

In the invention, the surface pressure at the surface pressure adjusting portion 25 is adjusted by changing the thicknesses of the coating members 21, 23. This method is effective especially in a situation that the precise surface pressure adjustment is required, such as at the turning portion where the thickness to be adjusted is relatively thin. If it is necessary to form thick at the turning portion, other adjustment device, such as a shim or metal plate, may be applied in the portion.

In the invention, the surface pressure at the surface pressure adjusting potion 25 can be changed by adjusting the thicknesses of the coating members 21, 23 by changing the thicknesses of the coating members and the number of the coatings, so that the adjustment can be easily made at a low cost. Thus, the gasket with the appropriate surface pressure adjusting portion 25 can be provided at a low cost.

Figure 3A:
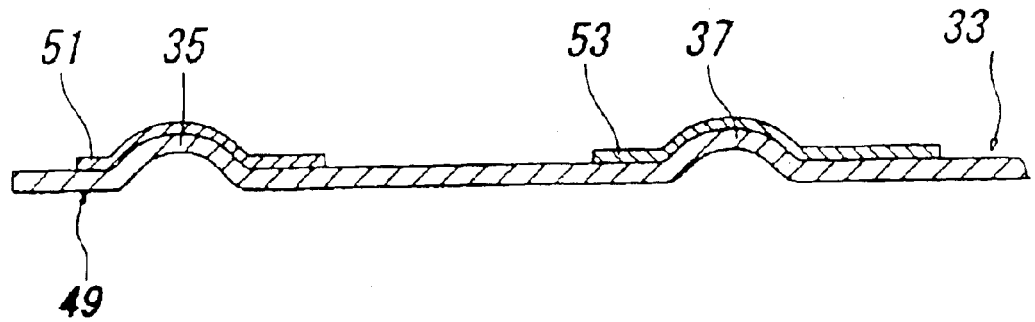
FIG. 3(a) is a partial sectional view of the second embodiment of the gasket before forming the gasket.
Figure 3B:
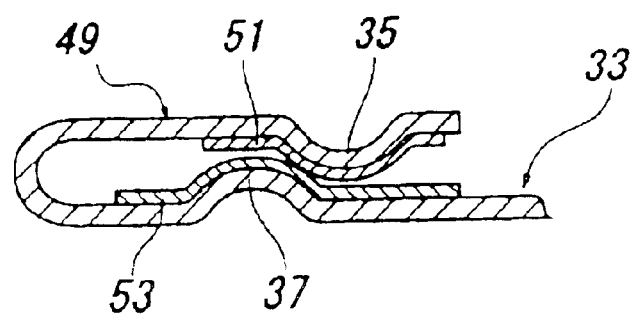
FIG. 3(b) is a partial sectional view after forming the gasket in the second embodiment.

FIGS. 3(a) and 3(b) show the second embodiment of the metal gasket of the invention. In the second embodiment, a metal plate 33 for forming the gasket is formed to have a bead 35 at a flange forming portion 49, and a bead 37 at a portion of the metal plate facing the flange. Then, coating members 51, 53 made of a material same as that of the coating members 21, 23 are applied to cover the beads 36, 37 and their vicinities. Thereafter, the flange forming portion is bent to be located above the base portion. In this situation, the beads 35, 37 are located diagonally, as shown in FIG. 3(b).

Figure 4A:
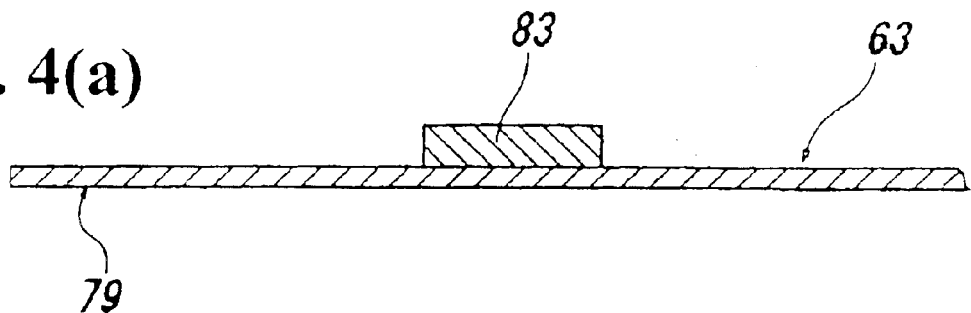
FIG. 4(a) is a partial sectional view of the third embodiment of the gasket before forming the gasket.
Figure 4B:
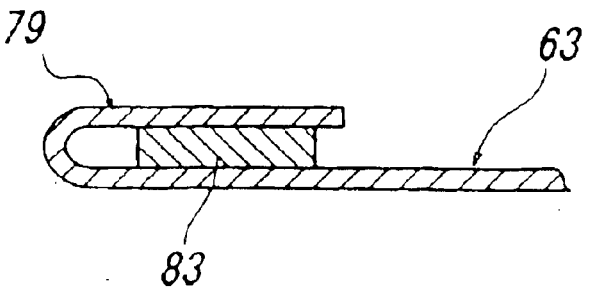
FIG. 4(b) is a partial sectional view after forming the gasket in the third embodiment.

FIGS. 4(a) and 4(b) show the third embodiment of the metal gasket of the invention. In the third embodiment, a coating 83 is formed at a portion of a metal plate 63 facing a flange, and no coating is formed at a flange forming portion 79. The gasket is formed when the flange forming portion 79 is bent.

In this embodiment, a part of the coating 83 is changed according to the location on the gasket. Namely, a half of the coating 83 facing the longitudinal end of the gasket (left half around the left cylinder bore 11 in FIG. 1) is made thick as shown in FIGS. 4(a) and 4(b), and the remaining half of the coating 83 is made thin to adjust the surface pressure (not shown). On the other hand, the portions around the cylinder bores adjacent to each other may be made thick to increase the surface pressure thereat. Also, the portions around the cylinder bore 11 located away from the bolt holes may be made thick to increase the surface pressure. Thus, the precise adjustment of the surface pressure can be easily made.

In the above embodiments, the coatings are formed on the metal plate at the turning portions around the cylinder bores. However, the coatings of the invention may not be limited to the above embodiments, and the turning portions with the coatings may be formed at any portions where the sealing is required, such as around the plate, any fluid holes and so on.

Further, in the above embodiments, the gasket is formed of the single metal plate. However, the invention is not limited thereto, and the invention can be applied to a metal laminate gasket formed of a plurality of metal plates.

In the invention, the turning portion formed around the hole or peripheral portion of the gasket is provided with the coating inside the turning portion. The thickness of the coating is adjusted to change the surface pressure easily and precisely. The adjustment is especially useful for the small adjustment of the surface pressure. The desired surface pressure can be easily formed at the turning portion.

What is claimed is:

1. A metal gasket for an internal combustion engine, comprising:

a metal plate including a base portion extending substantially throughout an entire area to be sealed and having an upper surface, at least one hole formed in the base portion, a curved portion extending from the base portion, and a flange extending from the curved portion and disposed on a part of the upper surface of the base portion, said curved portion and the flange being formed on at least one portion around the at least one hole and around an outer periphery of the base portion, and a coating member deposited on at least one of the flange facing the base portion and the base portion facing the flange, said coating member being formed of a non-thermoplastic coating material to operate as a surface pressure regulating member between the flange and the base portion to thereby regulate a surface pressure at the flange.

2. A metal gasket according to claim 1, wherein said coating member has a thickness partly changed to change the surface pressure at the flange.

3. A metal gasket according to claim 1, wherein said coating member includes a first coating portion formed on the base portion, and a second coating portion formed on the flange, said first and second coating portions being at least partly overlapped when the flange is placed on the base portion.

4. A metal gasket according to claim 1, wherein at least one of the flange and the base portion facing the flange has a bead extending toward the other, said coating member being deposited on and around the bead.

5. A metal gasket according to claim 4, wherein said flange and said base portion have beads facing diagonally with each other, and said coating member includes first and second coating portions formed on and around the respective beads.

6. A metal gasket for an internal combustion engine, comprising:

a metal plate including a base portion extending substantially throughout an entire area to be sealed and having an upper surface, at least one hole formed in the base portion, a curved portion extending from the base portion, and a flange extending from the curved portion and disposed on a part of the upper surface of the base portion, and a coating member deposited on at least one of the flange facing the base portion and the base portion facing the flange, said coating member being formed of a non-thermoplastic coating material to operate as a surface pressure regulating member between the flange and the base portion to thereby regulate a surface pressure at the flange and having a thickness partly changed to change the surface pressure at the flange.

* * * * *